United States Patent
Misiaszek et al.

(10) Patent No.: US 12,430,096 B2
(45) Date of Patent: Sep. 30, 2025

(54) VIRTUAL ASSISTANT MULTI-MODAL FUNCTIONALITY

(71) Applicant: Truist Bank, Charlotte, NC (US)

(72) Inventors: Alex Heath Misiaszek, Cornelius, NC (US); Michael Anthony Dascola, Raleigh, NC (US); Christopher Detzi, Chapel Hill, NC (US); Gabriel Sheridan, Iron Station, NC (US)

(73) Assignee: Truist Bank, Charlotte, NC (US)

( * ) Notice: Subject to any disclaimer, the term of this patent is extended or adjusted under 35 U.S.C. 154(b) by 503 days.

(21) Appl. No.: 17/898,799

(22) Filed: Aug. 30, 2022

(65) Prior Publication Data

US 2024/0069859 A1 Feb. 29, 2024

(51) Int. Cl.
| | | |
|---|---|---|
| G10L 15/00 | (2013.01) | |
| G06F 3/16 | (2006.01) | |
| G10L 15/08 | (2006.01) | |
| G10L 15/22 | (2006.01) | |
| G10L 15/30 | (2013.01) | |

(52) U.S. Cl.
CPC ............ *G06F 3/167* (2013.01); *G10L 15/083* (2013.01); *G10L 15/22* (2013.01); *G10L 15/08* (2013.01); *G10L 15/30* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/14; G10L 15/197; G10L 15/1822; G10L 15/183; G10L 15/19; G10L 15/193
See application file for complete search history.

(56) References Cited

U.S. PATENT DOCUMENTS 10,795,640 B1 * 10/2020 Knight .................. G06F 3/0482
10,809,876 B2 * 10/2020 Brown .................... G06F 3/167

* cited by examiner

*Primary Examiner* — Vu B Hang
(74) *Attorney, Agent, or Firm* — Kilpatrick Townsend & Stockton LLP; Michael A. Springs, Esq.

(57) ABSTRACT

A process for receiving, through a virtual assistant application, a first modality input related to a transaction profile. The process may involve identifying utterances from the first modality input. The process may further involve adjust a transaction service schema based on utterances identified from the first modality input and responding, through the virtual assistant application, with a first output derived from the transaction service schema. The process may further involve receiving, through the virtual assistant application, a second modality input related to the transaction profile. The process may then involve identifying utterances from the second modality input. The process may then involve adjusting the transaction service schema based on utterances identified from the second modality input. The process may conclude with responding, through the virtual assistant application, with a second output derived from the transaction service schema.

18 Claims, 4 Drawing Sheets

VIRTUAL ASSISTANT MULTI-MODAL FUNCTIONALITY

TECHNICAL FIELD

The present disclosure relates generally to virtual assistants and, more particularly (although not necessarily exclusively), to multi-modal forms of interaction for virtual assistants.

BACKGROUND

Communications, such as in-person interactions, telephone conversations, or electronic message exchanges, between a customer service associate and a client can be inefficient. Such interactions for simple tasks may also be unnecessarily expensive due to labor costs of the customer service associate. Managing communications between clients and customer service associates can be challenging.

SUMMARY

In an example, a non-transitory computer-readable medium includes instructions that are executable by a processing device for causing the processing device to perform operations. The operations include receiving, through a virtual assistant application, a first modality input related to a transaction profile and identifying utterances from the first modality input. The operations also include adjusting a transaction service schema based on utterances identified from the first modality input and responding, through the virtual assistant application, with a first output derived from the transaction service schema. Additionally, the operations include receiving, through the virtual assistant application, a second modality input related to the transaction profile in response to the first output. The operations also include identifying utterances from the second modality input and adjusting the transaction service schema based on utterances identified from the second modality input. Further, the operations include responding, through the virtual assistant application, with a second output derived from the transaction service schema.

In an additional example, a computer implemented method includes receiving, through a virtual assistant application, a first modality input related to a transaction profile and identifying utterances from the first modality input. The method also includes adjusting a transaction service schema based on utterances identified from the first modality input and responding, through the virtual assistant application, with a first output derived from the transaction service schema. Additionally, the method includes receiving, through the virtual assistant application, a second modality input related to the transaction profile and identifying utterances from the second modality input. Further, the method includes adjusting the transaction service schema based on utterances identified from the second modality input and responding, through the virtual assistant application, with a second output derived from the transaction service schema.

In an additional example, a system includes a processor and a non-transitory computer-readable medium including instructions that are executable by a processing device to perform operations. The operations include receiving, through a virtual assistant application, a first modality input related to a transaction profile and identifying utterances from the first modality input. The operations also include adjusting a transaction service schema based on utterances identified from the first modality input and responding, through the virtual assistant application, with a first output derived from the transaction service schema. Additionally, the operations include receiving, through the virtual assistant application, a second modality input related to the transaction profile and identifying utterances from the second modality input. The operations also include adjusting the transaction service schema based on utterances identified from the second modality input and responding, through the virtual assistant application, with a second output derived from the transaction service schema.

DETAILED DESCRIPTION

Certain aspects and examples of the present disclosure relate to multimodal functionality for actions delegated by a virtual assistant. A virtual assistant with multimodal functionality may be a software application used to communicate with a customer through a variety of communication modes. Example modes may include spoken natural language, typed natural language, interactions with graphical user interface objects on a smartphone, and interactions that originate on a first device but persist across a transaction profile to continue on a second device. For example, a customer may begin the process of making an account transfer on a personal computer. The customer may leave their personal computer and complete the process of making the account transfer on their smartphone. Example modes can also include presenting the customer with responses, confirmations, and options in the form visual aids such as charts, graphs, or buttons.

The virtual assistant with multimodal functionality may be able to enhance the reliability of certain modes and adapt to present options for customer preferred modes by machine learning. Optimizations achieved by machine learning may result from data gathered specific to a particular customer as well as data gathered about other customers. The virtual assistant may track variables such as customer interactions and time durations of customer engagement. The virtual assistant may update a default presentation mechanism based on such variables and based on customer interactions with the virtual assistant.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
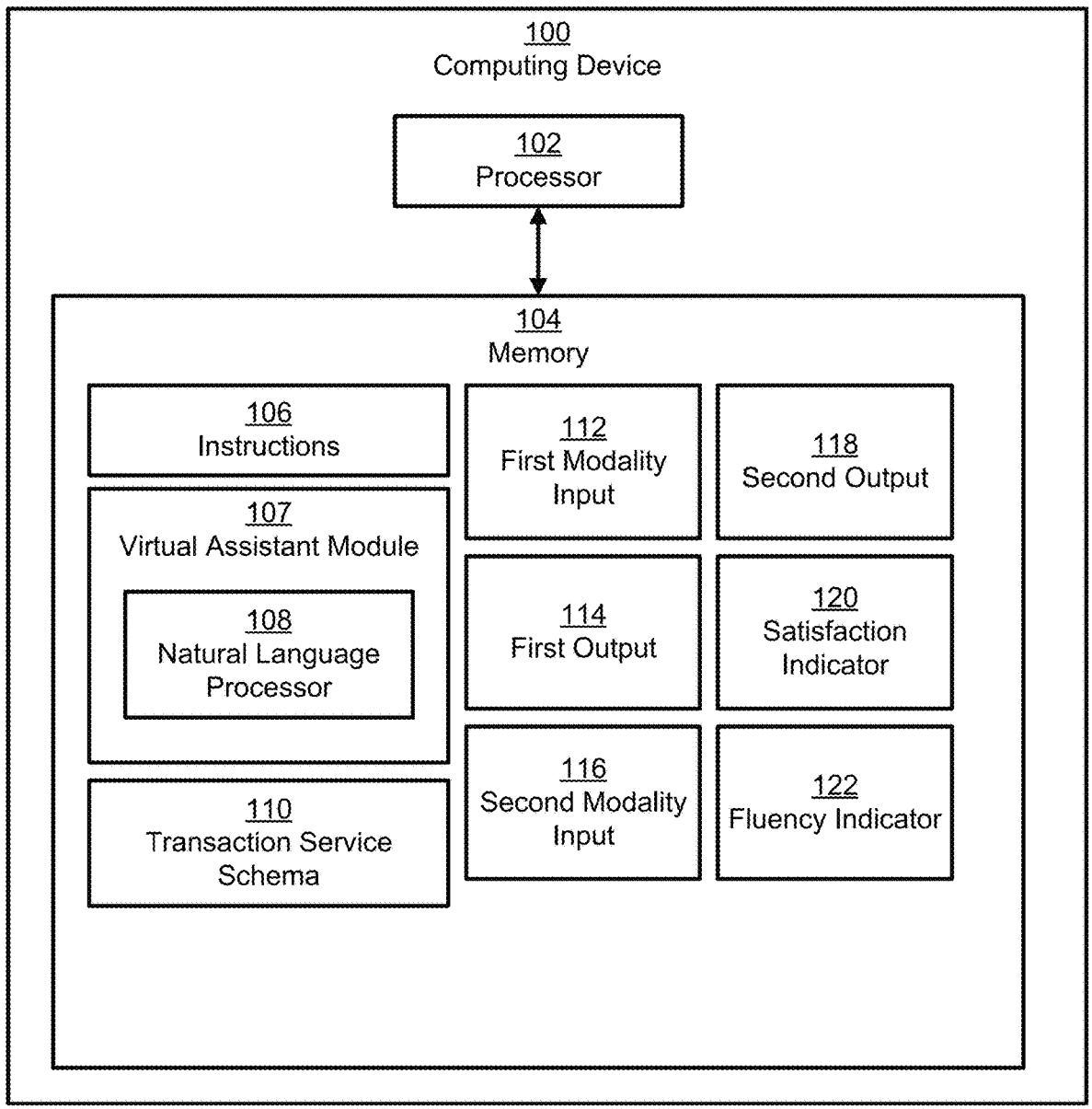
FIG. 1 is a block diagram of an example computing device, according to one example of the present disclosure.

FIG. 1 is a block diagram of an example computing device according to one example of the present disclosure. The computing device 100 includes a processor 102 that is communicatively coupled to a memory 104. In some examples, the processor 102 and the memory 104 may be distributed from (e.g., remote to) one another. The processor 102 can include one processing device or multiple processing devices. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform operations. In some examples, the instructions 106 can include processor-specific instructions generated by a compiler or an interpreter from code written in a suitable computer-programming language, such as C, C++, C#, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can include a non-transitory, computer-readable medium form which the processor 102 can read instructions 106. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 106.

The memory 104 may also contain a virtual assistant module 107. The virtual assistant module 107 may contain a natural language processor 108. The virtual assistant module 107 may use the natural language processor 108 to convert utterances into commands that may answer questions and perform actions by delegating requests to a set of online banking services.

The memory may also contain a dynamically adjusting transaction service schema 110. The transaction service schema 110 may be a dynamically adjusting set of commands the customer can select based on the customer's previous use behavior. For example, the transaction service schema 110 may begin with a wide range of possible transaction types, such as making transactions within a customer's accounts, making transactions between the customer and known entities, or providing customer service. As the customer interacts further with the virtual assistant 107, the transaction service schema 110 may adjust to a narrower scope. For example, the customer may seek customer service, and the transaction service schema 110 may focus on outcomes that can include troubleshooting questions, options to connect to a live agent, or options to schedule consultation.

The memory may also contain a first modality input 112, a first output 114, a second modality input 116, and a second output 118. The second modality input 116 may be distinct from the first modality input 112 by differing in the mode the customer interfaces with the virtual assistant 107. For example, the first modality input 112 may be spoken natural language, and the second modality input 116 may be typed natural language. The first output 114 and the second output 118 may be distinct from each other in the mode they present to the customer. For example, the first output 114 may be a graphical user interface (GUI) object with buttons on a touchscreen the customer can tap, while the second output 118 may be a pie chart breaking down the customer's sources of cash flow.

The memory may also contain various indicators, such as the satisfaction indicator 120 or the fluency indicator 122. Such indicators may reflect the past behavior of the customer towards the virtual assistant module 107. The values of these indicators may serve to better adjust the presentation of the virtual assistant module 107 to suit the customer's preferences or accessibility demands. For example, the virtual assistant 107 may have previously asked the customer directly if the virtual assistant had previously executed personal banking functions satisfactorily. Alternatively, the virtual assistant 107 may monitor certain behaviors, such as how much time a customer spends engaging with the virtual assistant to adjust the satisfaction indicator 120. If the satisfaction indicator 120 is sufficiently large, the virtual assistant 107 may present the customer with the recent charges of equal amounts. If the satisfaction indicator 120 is not sufficiently large, the virtual assistant 107 may request the customer provide more identifying information about the complaint.

Also, the transaction service schema 110 may broaden or narrow the set of commands it may present to the customer based on a satisfaction indicator 120. For example, if the satisfaction indicator 120 is below a certain threshold, the virtual assistant 107 may ask the customer more open-ended questions. Alternatively, if the satisfaction indicator 120 is above a certain threshold, the virtual assistant 107 may have more confidence in making suggestions based on previously collected data and may ask the customer more pointed questions, such as transferring particular amounts of funds to particular accounts.

Machine learning may be used to adjust the weight of variables that determine the satisfaction indicator 120, the fluency indicator 122, or other indicators. The weight of variables that may alter these indicators may be influenced by both the customer's behavior and data related to the behavior of other customers.

Figure 2:
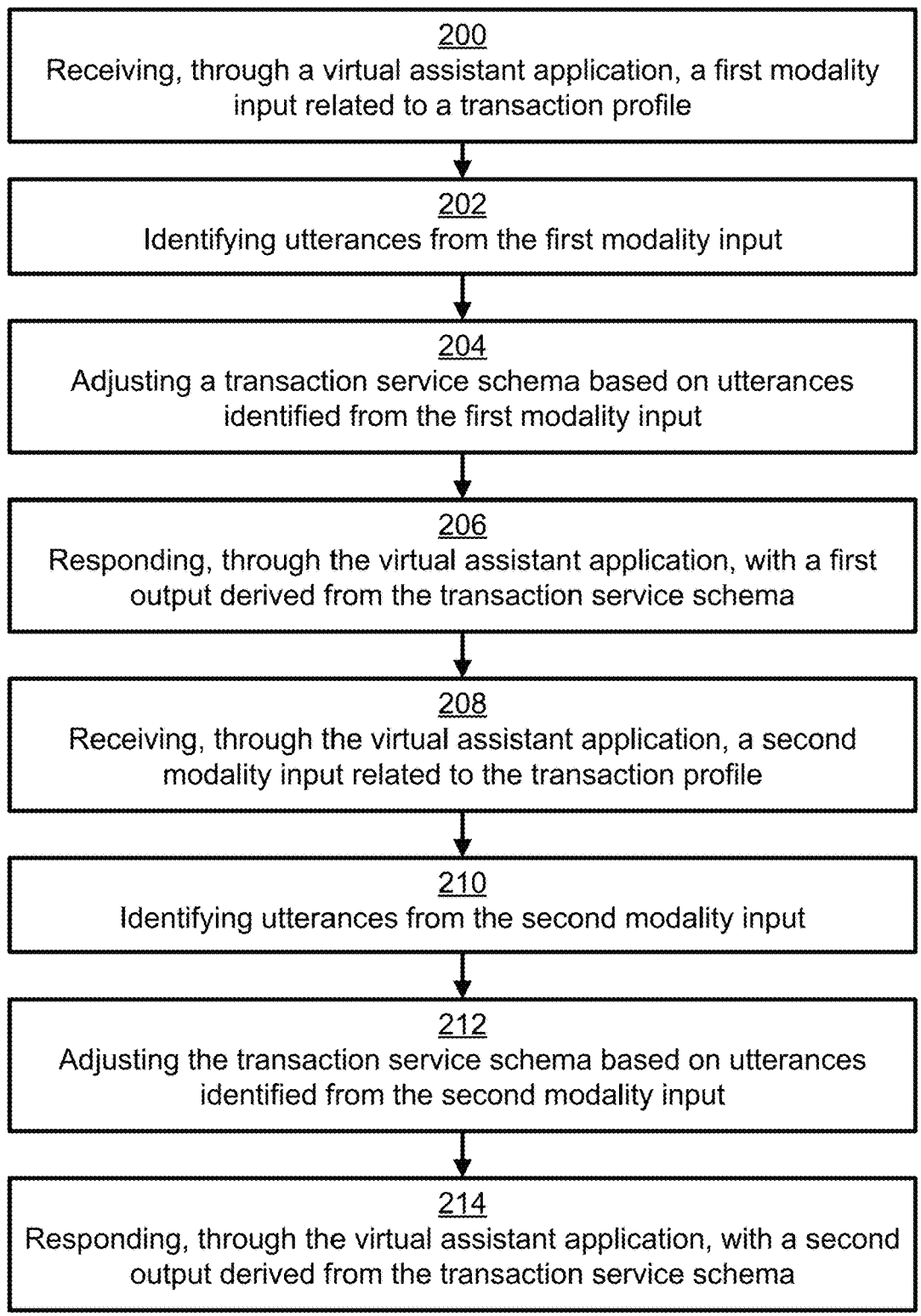
FIG. 2 is a flow chart of an example of a process for implementing some aspects of the present disclosure.

FIG. 2 is a flow chart of an example of a process for implementing some aspects of the present disclosure. In block 200, the computing device 100 may receive, by the virtual assistant 107, a first modality input 112 related to a transaction profile. The first modality input 112 may be a typed input of natural language, an audio input of natural language, at least one touchscreen gesture input, an at least one interaction with a graphical user interface (GUI) object, a photographic input, a video input, a button input, an accelerometer input, a gyroscope input, or any combination of the aforementioned inputs. The transaction profile may allow a customer to control at least one of the customer's banking accounts. For example, a transaction profile may allow a customer to control their checking account, savings account, and money market account from a common transaction profile.

In block 202, the computing device 100 may identify utterances from the first modality input 112. The utterances may be identified by a natural language processor 108 (NLP) of the virtual assistant 107. The NLP 108 may reference an utterance database that may organize utterances as synonyms for commands.

In block 204, the computing device may adjust a transaction service schema 110 based on the utterances identified from the first modality input 112. The utterances identified from the first modality input 112 may be translated or interpreted into commands for the transaction service schema 110. The transaction service schema 110 may be a dynamically adjusting set of commands the customer can select based on the customer's previous use history. The transaction service schema 110 may be influenced by commands issued relatively recently as utterances or GUI inputs. For example, the customer may have complained they were double charged for a bill. The transaction service schema 110 may adjust the set of commands it may present to the customer based on the utterances that expressed this complaint as well as a search of the customer's checking account for recent charges of equal amounts.

In some examples, the transaction service schema 110 may be terminated by a subsequent input or a second modality input 116. For example, the customer may issue the first modality input 112 as typed natural language requesting a transfer of funds. The customer may then terminate the resulting adjustment to the transaction service schema 110 by issuing a spoken request to cancel the request associated with the first modality input 112.

There may be other indicators like the satisfaction indicator 120 that may influence the breadth of options provided by the transaction service schema 110. For example, a customer may have a high value for the satisfaction indicator 120 but a low value for a fluency indicator 122 that quantifies how accurately the natural language processor 108 of the virtual assistant 107 is able to interpret the spoken utterances of the customer.

In some examples, the transaction service schema 110 may persist across multiple devices. For example, a customer may begin a transaction on a personal computer and continue the process on their smartphone. Continuity of the transaction service schema 110 across these devices may allow for a seamless transition from one device to another.

In block 206, the computing device 100 may respond through the virtual assistant 107 with a first output 114 derived from the transaction service schema 110. The first output 114 may be at least one question for the customer. The first output 114 may be a response to a question from the customer. The first output 114 may be a confirmation of an action performed in response to the first modality input 112. The first output 114 may be any combination of the aforementioned example outputs. The first output 114 may be presented with a particular modality based on various indicators, such as the satisfaction indicator 120

In block 208, the computing device 100 may receive, through the virtual assistant 107 a second modality input 116 related to the transaction profile. The second modality input 116 may be a typed input of natural language, an audio input of natural language, an at least one touchscreen gesture input, an at least one interaction with a graphical user interface (GUI) object, a photographic input, a video input, a button input, an accelerometer input, a gyroscope input, any suitable input, or any combination of the aforementioned inputs. The second modality input 116 may be distinct from the first modality input 112 by either being a different modality of input, a different combination of modalities, or an input issued from a different device. For example, the first modality input 112 may have been typed natural language and the second modality input 116 may have been spoken natural language.

In block 210, the computing device 100 may identify utterances from the second modality input 116. The utterances identified from the second modality input 116 may be translated or interpreted into commands for the transaction service schema 110 by the natural language processor 108.

In block 212, the computing device 100 may adjust the transaction service schema 110 based on utterances identified from the second modality input 116. The transaction service schema 110 may also be influenced by various indicators, such as the satisfaction indicator 120.

In block 214, the computing device 100 may respond, via the virtual assistant 107, with a second output 118 derived from the transaction service schema 110. The second output 118 may be an at least one question for the customer. The second output 118 may be a response to a question from the customer. The second output 118 may be a confirmation of an action performed in response to the second modality input 116. The second output 118 may be any combination of the aforementioned example outputs. The mode of the second output 118 may be presented based on various indicators, such as the satisfaction indicator 120 or fluency indicator 122.

Figure 3:
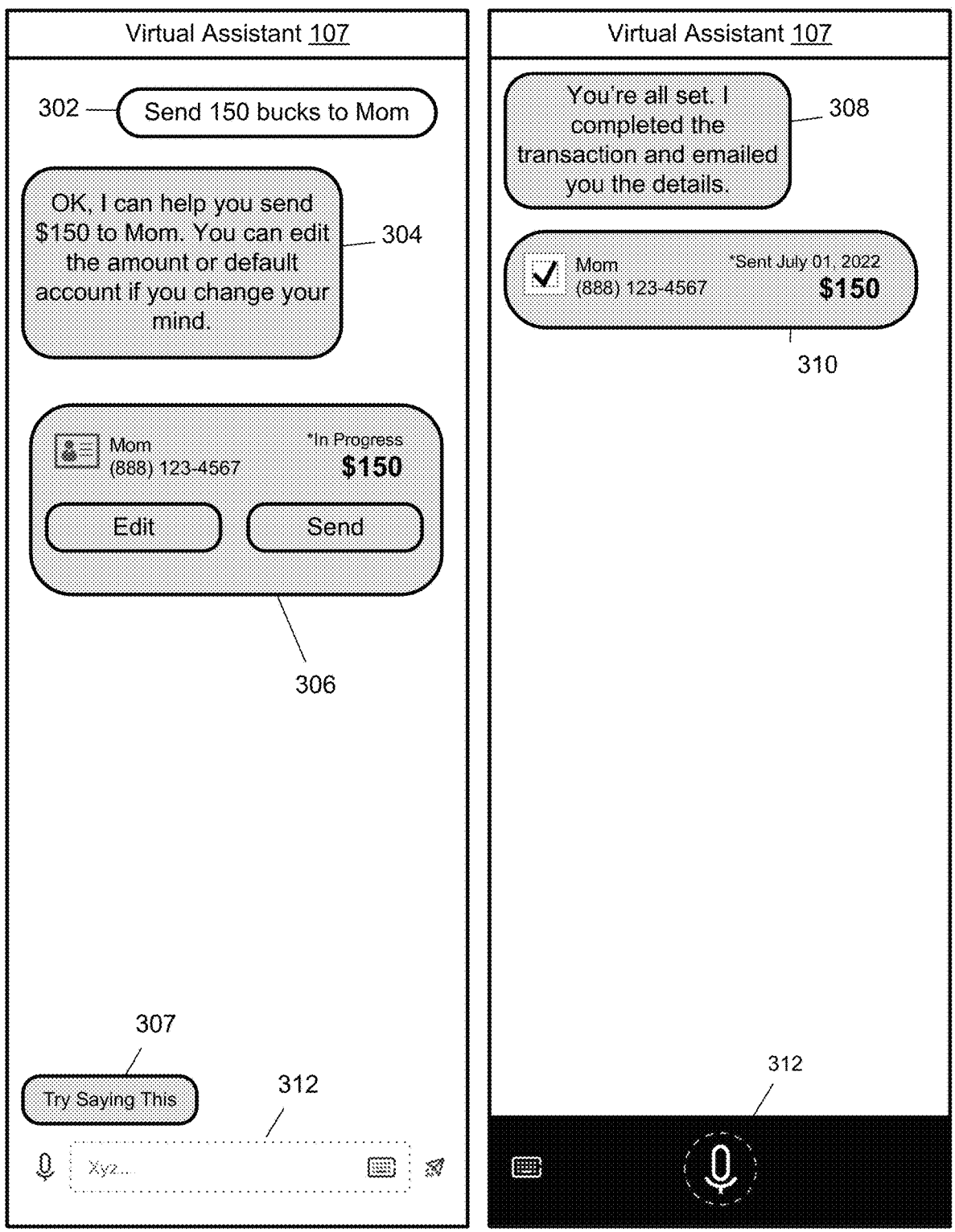
FIG. 3 is an example of a user interface (UI) for a virtual assistant module, according to some aspects of the present disclosure.

FIG. 3 is an example of a user interface (UI) for a virtual assistant 107, according to some aspects of the present disclosure. A first modality input 302 issued by the customer in natural language may request a transfer of funds. The virtual assistant 107 may generate a response by interpreting the first modality input 302 with the natural language processor 108. The virtual assistant 107 responds with a first output 304 directed at the customer. The first output 304, or any subsequent outputs of the virtual assistant 107, may be determined by a set of conditions other than the modality of an input. For example, an output, such as the first output 304, may be accompanied by a GUI object whenever an action can be accomplished by the virtual assistant 107 with a single, or limited number, of touchscreen interactions.

The first output 304 may accompany a graphical user interface (GUI) object 306, which may allow the customer to respond with a modality different from natural language. Responding with the GUI object 306 rather than natural language may constitute a second modality input. In the present example, the customer may tap a touchscreen to interact with the 'Send' button of the GUI object 306. This interaction may complete the transaction. In an additional example, the customer may tap a touchscreen to interact with the 'Edit' button of the GUI object 306. In such an example, this interaction may allow the customer to alter the amount of funds transferred by the virtual assistant.

The virtual assistant also contains a modality suggestion 307. The modality suggestion 307 may provide the customer with a suggestion to either direct the customer to provide more recognizable utterances or to increase customer engagement. For example, the modality suggestion 307 may recite "Try saying this—pay my electrical power bill," or "try saying this—check my balance."

The virtual assistant may also include a dynamic footer 312. The dynamic footer 312 may adjust to indicate to the customer what modality the customer is engaging with. The dynamic footer 312 may be useful for the customer when, for example, the customer wants to know whether they are being listened to. In some examples, when a vocal modality is selected, the dynamic footer 312 may transition back to a text or touch default modality if no utterances are detected for a pre-determined amount of time. This transition may ensure that the virtual assistant does not continue listening to voice inputs beyond the time frame intended by the customer. Other example modalities that may be indicated by the dynamic footer 312 may include gestures, video input, input from smart devices, or input from external devices.

The customer may select an option to send the funds, presented by the GUI object 306. The virtual assistant 107 may respond with a second output 308 in natural language. The second output 308 may accompany a second GUI object. The second output 308 and the second GUI object 310 may confirm execution of the customer's second modality input.

Figure 4:
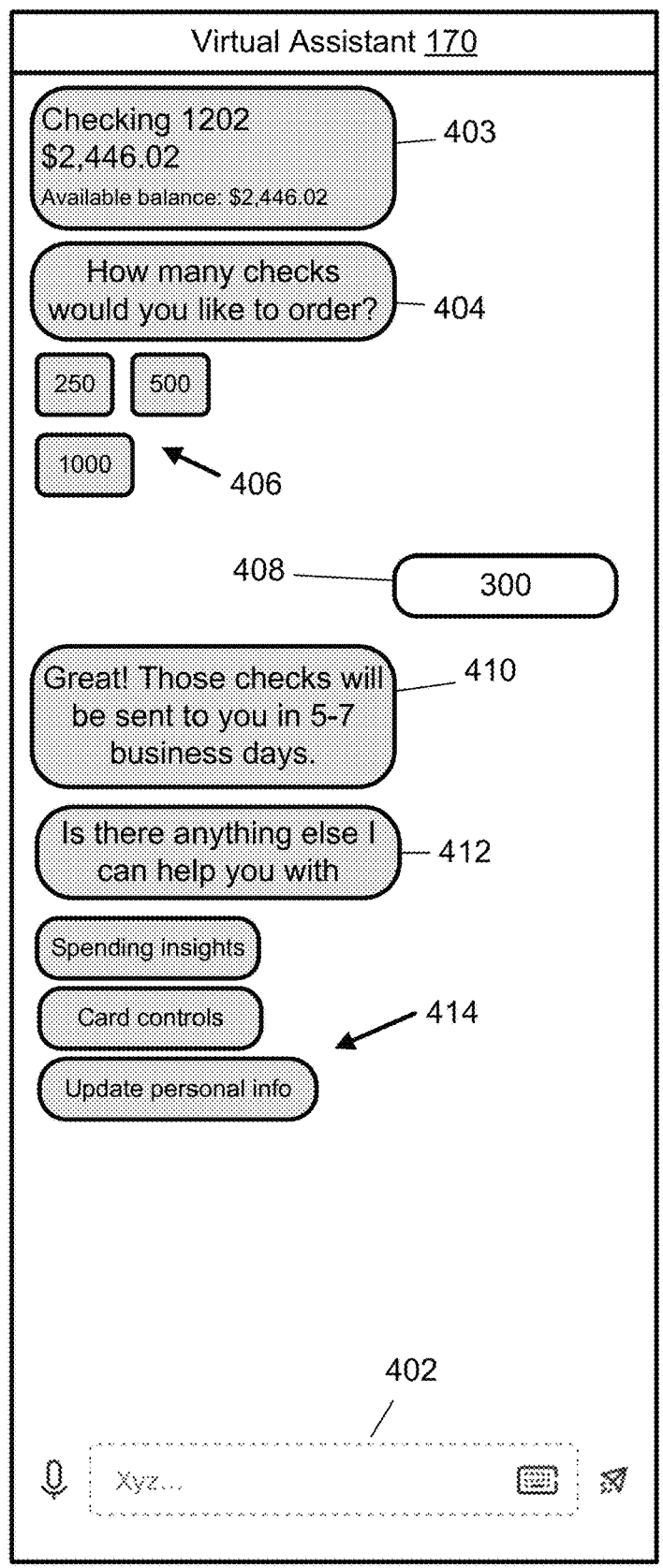
FIG. 4 is an example of a UI for a virtual assistant module, according to some aspects of the present disclosure.

FIG. 4 is an example of a UI for a virtual assistant module 107, according to some aspects of the present disclosure. A confirmation message 403 indicates to the customer a balance. The confirmation message 403 may result from activities that do not directly request information. In the present example, a checking account balance is provided when a customer has requested an order of paper checks. The content of such messages may be determined by pervious user activity, indicators such as the satisfaction indicator 120, data based on activity of other users, or default options.

The virtual assistant 107 may pair the confirmation message 403 with a check order GUI object 406. The check order GUI object 406, or similar GUI objects, may not contain the option a customer desires. In the present example, the customer has responded 408 with an amount different than the amounts offered in the check order GUI object 406. The customer may circumvent the options offered in the check order GUI object 406, or similar GUI objects, by responding through a different modality, such as text or speech.

The virtual assistant 107 may responds with a check order confirmation 410 and a follow-up question 412. The follow-up question 412 may be paired with an open-ended GUI object 414. The options provided by the open-ended GUI object 414 may depend on the user's previous activity, indicators such as the satisfaction indicator 120, data based on the activity of other users, or default options.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising instructions that are executable by a processing device for causing the processing device to perform operations comprising:
　receiving, through a virtual assistant application, a first modality input from a first user device associated with a user, the first modality input being in a first communication mode, and the first modality input being related to a transaction profile;
　identifying utterances from the first modality input;
　adjusting a transaction service schema based on the utterances identified from the first modality input;
　transmitting, by the virtual assistant application and to the first user device associated with the user, a first output derived from the transaction service schema;
　receiving, through the virtual assistant application and in response to the first output, a second modality input from a second user device associated with the user, the second modality input being in a second communication mode, the second modality input being related to the transaction profile, and the second communication mode being different from the first communication mode;
　identifying utterances from the second modality input;
　adjusting the transaction service schema based on the utterances identified from the second modality input; and
　transmitting, by the virtual assistant application and to the second user device associated with the user, a second output derived from the transaction service schema.

2. The non-transitory computer-readable medium of claim 1, wherein the first output comprises a graphical user interface object, wherein the operations further comprise outputting, via the virtual assistant application, the graphical user interface object on the second user device associated with the user, and wherein the second modality input is a user selection of the graphic user interface object.

3. The non-transitory computer-readable medium of claim 1, wherein a modality of the first output and a modality of the second output are based on at least a satisfaction indicator and a fluency indicator generated from user interactions with the virtual assistant application.

4. The non-transitory computer-readable medium of claim 1, wherein the operations further comprise:
　deriving the first output and the second output from the transaction service schema, wherein the first output and the second output comprise separate modalities.

5. The non-transitory computer-readable medium of claim 1, the operations further comprising receiving the second modality input by a graphical user interface input.

6. The non-transitory computer-readable medium of claim 1, wherein the first communication mode and the second communication mode are selected from a group consisting of: a touchscreen gesture input, an interaction with a graphical user interface (GUI) object, a photographic input, a video input, a button input, an accelerometer input, and a gyroscope input.

7. The non-transitory computer-readable medium of claim 1, wherein the operations further comprise:
　terminating the transaction service schema by the second modality input.

8. A computer-implemented method comprising:
　receiving, through a virtual assistant application, a first modality input from a first user device associated with a user, the first modality input being in a first communication mode, and the first modality input being related to a transaction profile;
　identifying utterances from the first modality input;
　adjusting a transaction service schema based on the utterances identified from the first modality input;
　transmitting, by the virtual assistant application and to the first user device associated with the user, a first output derived from the transaction service schema;
　receiving, through the virtual assistant application and in response to the first output, a second modality input from a second user device associated with the user, the second modality input being in a second communication mode, the second modality input being related to the transaction profile, and the second communication mode being different from the first communication mode;
　identifying utterances from the second modality input;
　adjusting the transaction service schema based on the utterances identified from the second modality input; and
　transmitting, by the virtual assistant application and to the second user device associated with the user, a second output derived from the transaction service schema.

9. The computer-implemented method of claim 8, wherein the first output comprises a graphical user interface object, wherein the computer-implemented method further comprises outputting, via the virtual assistant application, the graphical user interface object on the second user device associated with the user, and wherein the second modality input is a user selection of the graphic user interface object.

10. The computer-implemented method of claim 8, wherein a modality of the first output and a modality of the second output are based on at least a satisfaction indicator and a fluency indicator.

11. The computer-implemented method of claim 8, further comprising:
deriving the first output from the transaction service schema; and
deriving the second output from the transaction service schema, wherein the first output and the second output comprise separate modalities.

12. The computer-implemented method of claim 8, wherein the first communication mode and the second communication mode are selected from a group consisting of: a touchscreen gesture input, an interaction with a graphical user interface (GUI) object, a photographic input, a video input, a button input, an accelerometer input, and a gyroscope input.

13. The computer-implemented method of claim 8, further comprising:
terminating the transaction service schema by the second modality input.

14. A system comprising:
a processor; and
a non-transitory computer-readable medium comprising instructions that are executable by a processing device to perform operations comprising:
receiving, through a virtual assistant application, a first modality input from a first user device associated with a user, the first modality input being in a first communication mode, and the first modality input being related to a transaction profile;
identifying utterances from the first modality input;
adjusting a transaction service schema based on the utterances identified from the first modality input;
transmitting, by the virtual assistant application and to the first user device associated with the user, a first output derived from the transaction service schema;
receiving, through the virtual assistant application and in response to the first output, a second modality input from a second user device associated with the user, the second modality input being in a second communication mode, the second modality input being related to the transaction profile, and the second communication mode being different from the first communication mode;
identifying utterances from the second modality input;
adjusting the transaction service schema based on the utterances identified from the second modality input; and
transmitting, by the virtual assistant application and to the second user device associated with the user, a second output derived from the transaction service schema.

15. The system of claim 14, wherein the first output comprises a graphical user interface object, wherein the operations further comprise outputting, via the virtual assistant application, the graphical user interface object on the second user device associated with the user, and wherein the second modality input is a user selection of the graphic user interface object.

16. The system of claim 14, wherein a modality of the first output and a modality of the second output are based on at least a satisfaction indicator and a fluency indicator generated from user interactions with the virtual assistant application.

17. The system of claim 14, wherein the operations further comprise:
deriving the first output and the second output from the transaction service schema, wherein the first output and the second output comprise separate modalities.

18. The system of claim 14, wherein the first communication mode and the second communication mode are selected from a group consisting of a touchscreen gesture input, an interaction with a graphical user interface (GUI) object, a photographic input, a video input, a button input, an accelerometer input, a gyroscope input, or any combination thereof.

* * * * *